June 16, 1964 W. BAUMGARTNER ET AL 3,137,762

ARRANGEMENT FOR AMPLIFYING THE BRIGHTNESS OF AN OPTICALLY FORMED IMAGE

Filed Sept. 1, 1960 6 Sheets-Sheet 4

June 16, 1964 W. BAUMGARTNER ETAL 3,137,762

ARRANGEMENT FOR AMPLIFYING THE BRIGHTNESS OF AN OPTICALLY FORMED IMAGE

Filed Sept. 1, 1960 6 Sheets-Sheet 5

United States Patent Office 3,137,762
Patented June 16, 1964

3,137,762

ARRANGEMENT FOR AMPLIFYING THE BRIGHTNESS OF AN OPTICALLY FORMED IMAGE

Willy Baumgartner, Clément Baumberger, and Albert Jaques, Zurich, Switzerland, assignors to Gesellschaft zur Foerderung der Forschung an der Eidg. Techn. Hochschule, Zurich, Switzerland Filed Sept. 1, 1960, Ser. No. 53,469
Claims priority, application Switzerland June 30, 1960
9 Claims. (Cl. 88—61)

This invention relates to an arrangement for amplifying the brightness of an optically formed image.

Arrangements serving the same purpose are already known and have been described for instance in the United States Letters Patent No. 2,896,507. They include at least one zone which is preferably strip-shaped, illuminated by a source of light and optically imaged on an associated strip-shaped diaphragm via a mirrored surface. The mirrored surface is on a layer deformable by electrostatic field forces and is also deformable by the same. The image to be amplified is formed rastered on a photoelectric conducting layer which influences an electrostatic field acting upon the deformable layer. Means are also provided for optically viewing the mirrored surface past the edges of the strip-shaped diaphragm or between the strip-shaped diaphragms if a plurality of such diaphragms are provided. Preferably, the mirrored surface is imaged on a projection screen, on which an image of greater brightness corresponding to the image to be amplified is then perceptible.

The primary object of the invention is to improve the described arrangements. For a better understanding of the underlying task of the invention and the technological advance thereby achieved, it seems proper to explain at first the structure and action of a known arrangement of the type referred to at the beginning with reference to FIGS. 1–3 of the drawing.

Figures 1, 2:
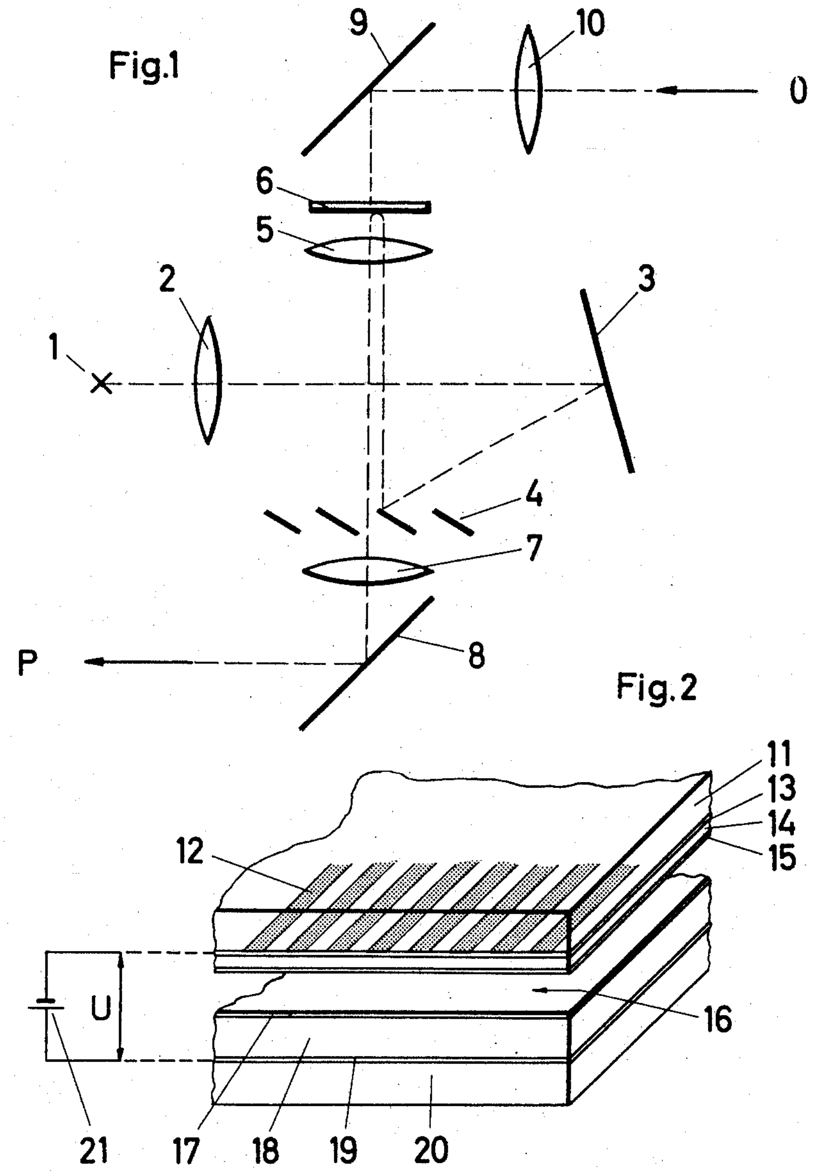
FIG. 1 shows diagrammatically the general layout of a known arrangement.
FIG. 2 represents, on a larger scale and in perspective view, a section of a detail of the arrangement according to FIG. 1.

According to FIG. 1, a strong light source 1, say a voltaic arc, has allocated thereto a condenser 2 which focusses the light and throws it over a deflecting mirror 3 onto a system of bars 4. The system consists of several parallel opaque bars 4 in the form of strips which are spaced from each other and have to perform two tasks. The first task of the bars 4 consists in forming strip-shaped zones which are brightly illuminated by the light emanating from the source 1. For this purpose the upwardly turned side (in FIG. 1) of the bars 4 is designed reflecting. The second task of the bars 4 is to serve as strip-shaped diaphragms. On the illuminated side of the bars 4 there are an objective 5 and a light-modulating member 6 which is composed of several layers and whose structure is explained further below with reference to FIG. 2. The member 6 includes a mirrored surface, over which the illuminated bars 4 are imaged by means of the objective 5 on the bars 4 now acting as diaphragms, the objective 5 being passed through twice by the light rays. A projection lens 7 and a deflecting mirror 8 are so arranged as to produce through the gaps between the bars 4 the mirrored surface of the light-modulating member 6 in the direction of the arrow P on a screen (not shown). In this projecting, the bars 4 merely act as diaphragms which are not reproduced on the screen. Another deflecting mirror 9 and an objective 10 make it possible optically to produce an image by light rays according to the arrow 0 on a photo-conducting layer of the light-modulating member 6, which image may originate from a diapositive, a film or actual objects, etc.

The light-modulating member 6 is constructed as shown in FIG. 2. A carrier plate 11 permeable to light is provided with an opaque line raster 12 which, for instance, consists of metal strips deposited by evaporation in vacuo. The underside of the carrier plate 11 has arranged thereon an electrically conducting opaque electrode layer 13 which may be a thin metal film or a film of tin dioxide and has been produced say by spraying the respective substance or depositing same by evaporation. The raster 12 and the electrode layer 13 may also be interchanged in position. Underneath the raster 12 and electrode layer there is the aforesaid photo-conducting layer 14 which for instance consists of selenium. There follows an electrically insulating opaque layer 15.

The upper side of a second transparent carrier plate 20 has again applied thereto an electrically conducting electrode layer 19 permeable to light, with an overlying elastic layer which is deformable by electrostatic field forces and consists of, say polyvinylchloride with plasticizer, has a thickness of about 50$\mu$ and a modulus of elasticity of $10^4$ to $10^6$ dynes/cm.$^2$ The layer 18 has an adhering mirrored layer 17 which consists of silver, aluminium or the like deposited by evaporation and is also deformable by the deformable layer 18. Between the opaque layer 15 and the mirrored layer 17 there is a space 16 filled with a gaseous medium, such as air, which permits of deforming the layers 17 and 18. The surfaces of all plates and layers 11–20 are flat and parallel to each other. The two electrode layers 13 and 19 have connected thereto a source of voltage 21 with the voltage U.

The action of the described arrangement is as follows:

With the aid of the electrodes 13 and 19 and the voltage U applied thereto, an electric field is produced which passes through the layers 14–18. The electric field has different values in the various layers according to their electric resistance. With little resistance of the deformable layer 18, the whole voltage U lies practically between the electrode 13 and the mirrored layer 17 alone, which is presumed here for the sake of simplicity. The electric field strength standing at right angles to the mirrored layer 17, exerts a force thereon according to electrostatic law, which, with suitable selection of the elasticity constant of the deformable layer 18 as well as of the thickness of the mirrored layer 17 and deformable layer 18, is capable of deforming the two last-named layers, which is possible without hindrance by the gaseous intermediate layer 16. If no light falls over the objective 10 and deflecting mirror 9 on the photo-conducting layer 14, then the electric field, apart from the marginal effect, is homogeneous, and no deformation of the surface of layer 18 will take place. Hence the mirrored layer 17 remains flat. Since the images of the illuminated upper side of the bars 4 again fall exactly on these bars, no light can pass to the objective 7 past the bars 4, for which reason the screen remains dark.

Figure 3:
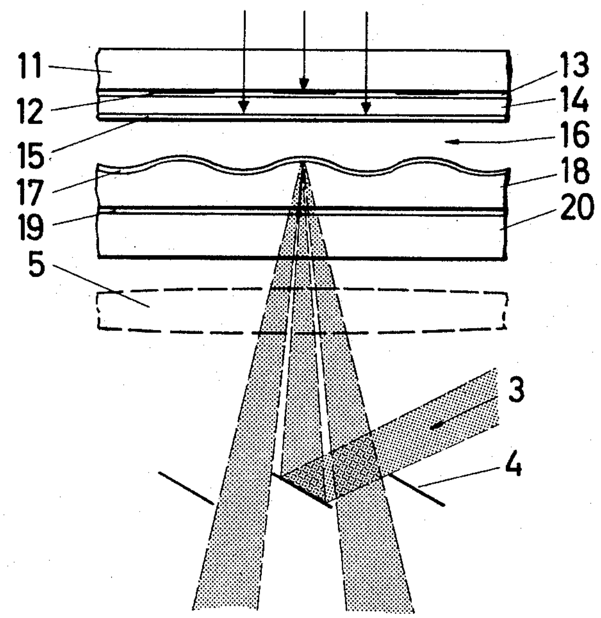
FIG. 3 represents details of FIG. 1 on a larger scale and serves for illustrating the mode of action of the arrangement.

If however, according to the arrow O, light falls through the raster 12 on the photo-conducting layer 14, the electric resistance of layer 14 varies at the places where light falls on it. At those places this causes an alteration of the field forces acting upon the layers 17 and 18 and leads, because the field is now non-homogeneous, to an almost sinusoidal deformation of the layers 17 and 18 at the corresponding places, as shown in FIG. 3. The mirrored surface 17 thus distorted represents a reflecting diffraction grating and then permits light of the source 1 to pass through the gaps between the bars 4, in that now, owing to diffraction, the illuminated bars are not only imaged on themselves, but also wholly or partially in the gaps between the bars 4. By means of the objective 7 and mirror 8, the light passing between the bars 4 is thrown in the direction of the arrow P onto the screen, on which the illuminated places of the photo-conducting layer 14 appear as corresponding bright image portions.

Remnants of the strong light beam from the objective 5, which pass through the mirrored surface, are prevented by the opaque layer 15 from reaching and interfering with the conducting layer 14. With sufficiently small optical permeability of the mirrored layer 17, the opaque layer 15 may be dispensed with in a given case which is presumed in what follows.

It must be emphasized here, that the strips of the raster 12 run parallel to the bars 4, since only then the desired deformation of the layers 17 and 18 takes place in such a way that the diffracted light of the source 1 falls through the gaps between the bars 4. If the strips of raster 12 would for instance run at right angles to the bars 4, the light would be diffracted only in the longitudinal direction of the bars. The images of the illuminated surface of the bars 4 in this case, also after diffraction, would further come to lie on the bars 4, and no light could fall through the gaps between the bars 4 onto the screen.

A closer analysis now shows that in the already known form of embodiment of the light amplifying arrangement explained above, some essential conditions, significant both fundamentally and technologically, must be fulfilled. These conditions refer to the geometry and physical characteristics of the photo-conducting layer 14 and are stated in the following.

In order to attain good control of the deformation of the layers 17 and 18 by the photo-conducting layer 14, the latter should have, as shown by calculation and experiments, a minimum thickness of about one fourth of the period of the raster 12. If the same has the commercial value of $200\mu$, this leads to a thickness of the layer 14 of approximately $50\mu$. Thereby the photo-conducting layer 14 and the mirrored surface 17 should be spaced apart from each other only by about one sixth of the raster period. Higher values are inadmissible because of the weakening of the control thereby occurring. If one would reduce the thickness of the photo-conducting layer 14 to, say $5\mu$, this would require a raster period of $20\mu$ and a distance apart of the layers 14 and 17 from each other of less than $1\mu$, which on principle would inadmissibly restrict the deformation amplitude of the layers 17 and 18 and entail great difficulties in technological respect.

In numerous photoelectric conductors, the spectral range of great sensitivity is associated with a relatively high absorption coefficient. As a result, with a $50\mu$ thick photo-conducting layer, only a small portion of the total thickness will be penetrated by the rays. The non-penetrated remainder of the conducting layer contributes nothing to the modulation, but acts in fact like an enlargement of the distance between mirrored layer 17 and part-thickness of the conducting layer 14 that is influenced by the light.

Moreover, photo-conducting layers with a thickness of about $50\mu$, frequently are only available in the form of sedimented powders embedded in synthetic resins. Such granular agglomerates, however, possess an electric conductivity of a magnitude varying locally to a great extent. This entails corresponding inhomogeneities of the electric field in the conducting layer 14 and in the interspace 16 with unilluminated layer 14, which leads to undesired deformations of the layers 17 and 18 and also to undesired brilliances on the projection screen. Another disadvantage of such photo-conducting layers made of granular material is seen in their light scatter. If light falls onto the conducting layer 14 as shown by the arrow O, the light is scattered in the layer 14 and also influences those portions thereof which are protected by the raster 12 from direct illumination. Thus the difference of the electric resistance of layer portions within and outside the shaded zones of the raster are reduced so that the deformation effect will be less.

Finally, the resistance of the photo-conducting layer 14 in darkness should have a value of at least $10^{10}$ ohms in order to attain favorable distribution of the voltage U on the layer 14 and interspace 16. It is only then that changes of the resistance in the layer 14 will bring about appreciable alterations of the field on the surface of the mirrored layer 17. Therewith many technically interesting, photo-conducting substances are excluded from being used because of their high conductivity in the dark.

All aforedescribed disadvantages can be obviated with the arrangement according to the invention, which is principally characterized in that the photo-conducting layer on the side from which the image to be amplified is produced on it, has an electrode raster preceding it, which comprises a group of electrically conducting strips in spaced juxtaposed relation, whose longitudinal edges run orthogonally to the longitudinal edges of the strip-shaped diaphragm, and which are connected in alternate sequence to one pole or the other of a source of electric potential; the electrode raster has in turn an additional raster preceding it, which includes portions impermeable to light of certain frequencies at least, the geometric configuration of which portions differing from that of the strips of the electrode raster. Consequently, instead of the previous raster, designed as desired, there are now provided the electrode raster and the additional raster with the described characteristics.

Further features of the invention will appear from the following description and claims, taken in conjunction with the accompanying drawing which, in FIGS. 4 to 11, illustrates purely by way of example and diagrammatically some forms of embodiment incorporating the invention.

Figure 4:
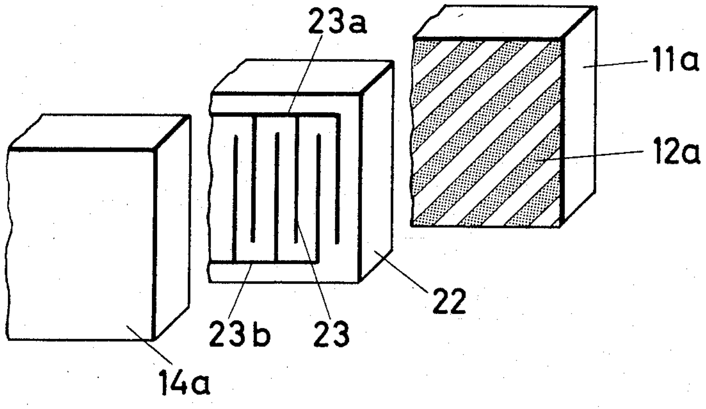
Figure 4A:
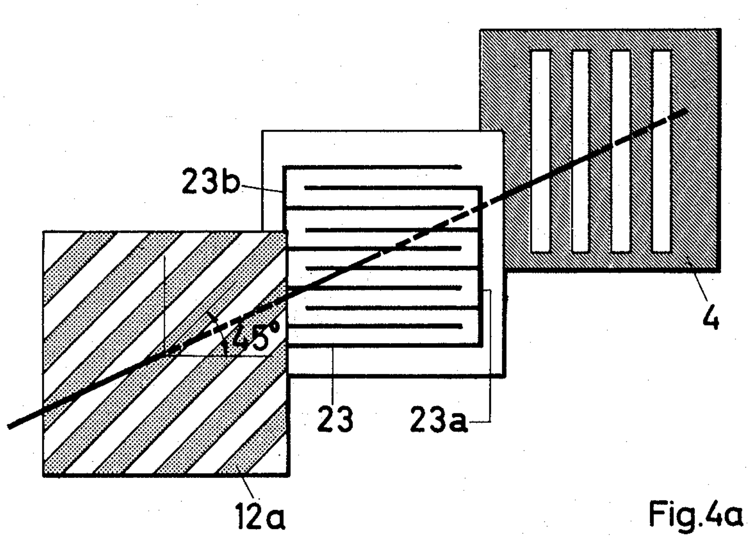
Figure 5:
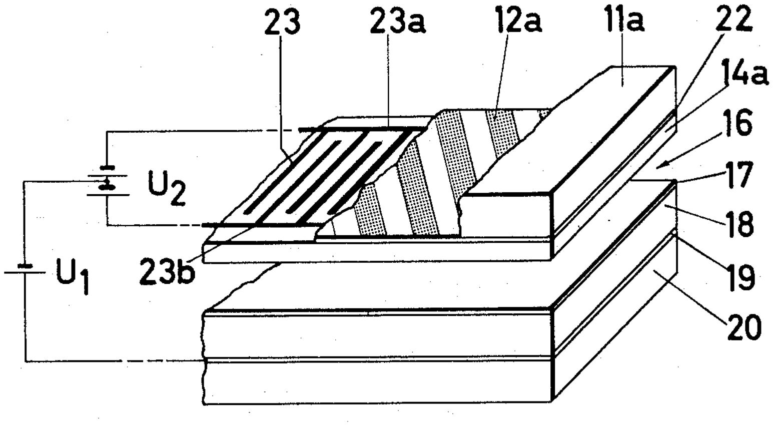
Figure 6:
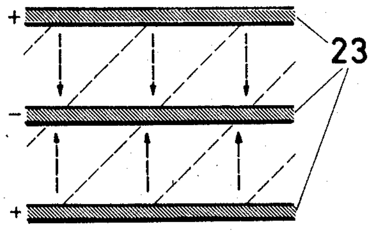
Figure 6A:
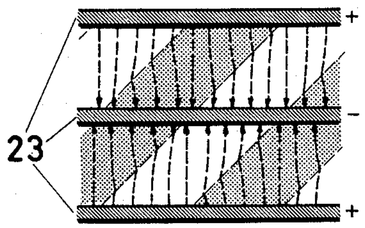
Figure 7:
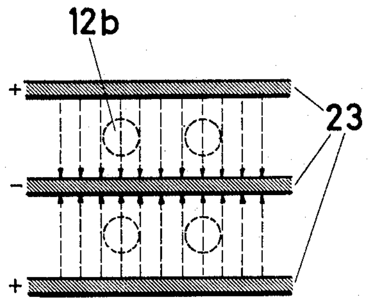
Figure 7A:
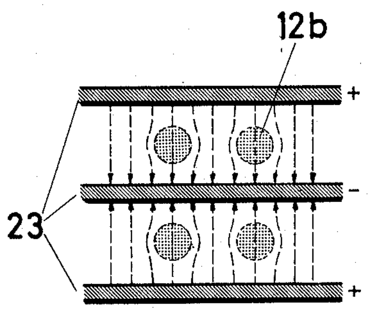
Figure 8:
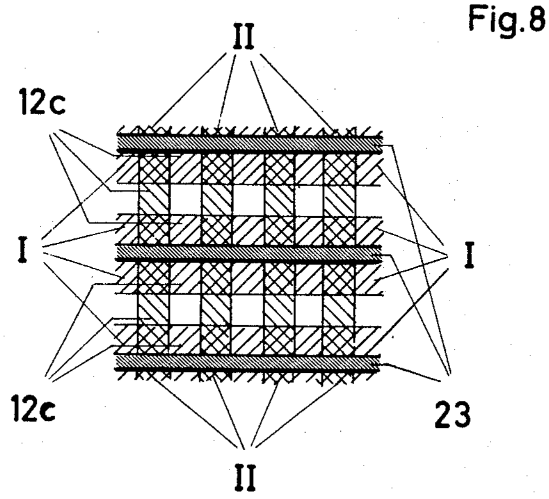
Figure 9:
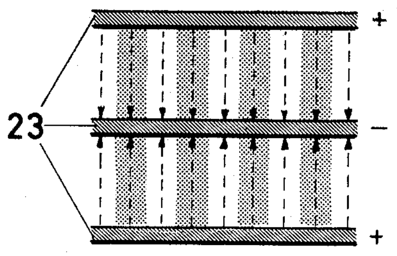
Figure 10:
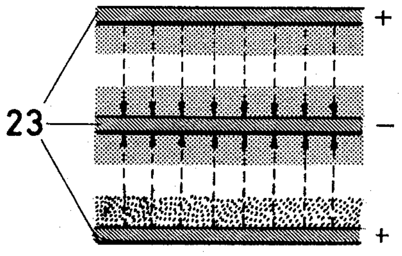
Figure 11:
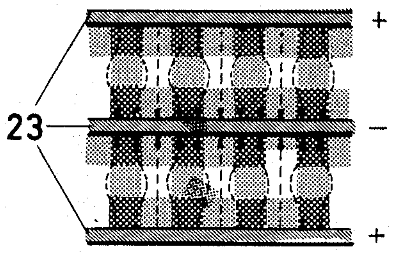

In said drawing:

FIG. 4 shows diagrammatically and, for the sake of clarity, in exploded view several component parts of a first form of embodiment, which replace the parts 11–14 of the known embodiment according to FIGS. 2 and 3;

FIG. 4*a* represents diagrammatically the relative arrangement of the strip-shaped diaphragms, electrode raster and additional raster of the form according to FIG. 4;

FIG. 5 shows in perspective representation a fragmentary view of the light-modulating member according to the same form;

FIGS. 6 and 6*a* show each in plan view a section of the light-modulating member without illumination and with illumination respectively of the photo-conducting layer;

FIGS. 7 and 7*a* show each in plan view a section of the light-modulating member according to a modified embodiment, with a differently designed additional raster without illumination and with illumination respectively of the photo-conducting layer;

FIG. 8 shows in plan view a section of the light-modulating member according to a further form with two strip rasters which run orthogonally to each other and are permeable and opaque respectively to different light frequencies;

FIG. 9 shows the same with illumination by light which is let through by one strip raster, but stopped by the other;

FIG. 10 is a similar representation in case of illumination by light which is let through by the other strip raster and retained by the first strip raster;

FIG. 11 represents the same light-modulating member on simultaneous illumination by the two aforesaid types of light.

Referring to the forms of embodiment shown in FIGS. 4 to 6, according to FIG. 4 a transparent carrier plate 11*a* is again provided with an opaque line raster 12*a* which for instance consists of metallic strips deposited by evaporation in vacuo. The period of the raster 12*a* amounts for instance to about 200μ. A second transparent and electrically insulating plate 22 has applied thereto an electrode raster 23 which consists of two groups of interdigitated electrically conducting strips which are arranged in juxtaposed spaced relation and which may also be produced as deposited by evaporation in vacuo. For the sake of clarity, in FIG. 5 the rasters 12a and 23 are partially shown detached from the pertinent carrier plates 11a and 22. The strips of the raster 23 are alternately connected to two electric leads 23a and 23b, by means of which they are joined to one pole or the other of a source of electric potential $U_2$ (FIG. 5). By cementing, say, by means of a transparent synthetic resinous material, the two plates 11a and 22 are firmly connected to each other, so that the side of plate 22, turned away from the electrode raster 23, lies against the plate 11a carrying the raster 12a. The raster 12a is thus placed between the plates 11a and 22. The longitudinal edges of the strips of raster 12a include with the longitudinal edges of the strips of electrode raster 23 an angle which is between zero and 90 degrees, preferably 45 degrees. The side of plate 22 provided with the electrode raster 23 has applied thereto a photo-conducting layer 14a of, say selenium, which is preferably only 0.5μ thick, but at least so that the electric resistance of the conducting layer 14a cannot be affected by shunt of the plate 22. The thickness of plate 22 is for instance 100μ, if of glass, and will in each case be so chosen that on the one hand the electrode raster 23 is sufficiently insulated from the likewise electrically conducting raster 12a and that on the other hand a light beam falling through the raster 12a provides a sufficiently sharp casting of the shadow of raster 12a in the plane of the electrode raster 23.

According to FIG. 5, the rest of the design of the light-modulating member is the same as in the known embodiment. On one side of the transparent carrier plate 20 there is the electrically conducting electrode layer 19 permeable to light, which may be a thin metallic film or a film of tin dioxide or the like and has been produced, say by spraying or depositing by evaporation. The overlying elastic layer 18 is deformable by electrostatic field forces and may consist of, say polyvinylchloride with plasticizer, and carries the mirrored layer 17 also deformable by means of the layer 18. The mirrored surface 17 and the layer 14a have therebetween the space 16 filled with a gaseous medium, such as air, which allows the layers 17 and 18 to be deformed. If desired, an electrically insulating opaque layer, corresponding to the layer 15 as in FIGS. 2 and 3, may also be interposed between the conducting layer 14a and the space 16.

The electrode layer 19 is connected to one pole of a source of potential $U_1$, the other pole of which is connected to a center tapping of the source of potential $U_2$, but could also be connected in another manner to the electrode raster 23. The sources of potential $U_1$ and $U_2$ could be of the D.C. or A.C. type.

The disclosed light-modulatig member is disposed in exactly the same way as the member 6 of FIG. 1 in the other arrangement, but certainly under the condition that the longitudinal edges of the strips of the electrode raster 23 extend orthogonally to the longitudinal edges of the bars 4. The relative orientation of the raster 12a, electrode raster 23 and bars 4 is clearly shown in FIG. 4a.

The action of the described arrangement is as follows: By means of the electrode layer 19, electrode raster 23 and source of potential $U_1$ an electric field is produced which penetrates through the layers 14a and 16–18. The electric field has different values in the various layers according to their electric resistance. With little resistance of the deformable layer 18, the whole potential $U_1$ lies practically between the mirrored layer 17 and electrode raster 23 alone. By the source of potential $U_2$ and the strips of the electrode raster 23, the electric field becomes inhomogeneous, that is locally variable in the direction at right angles to the strips of the electrode raster 23. According to electrostatic laws, the electric field strength exerts forces upon the mirrored layer 17, which, due to said inhomogeneousness causes a wavy deformation of the mirrored layer 17. But if no light passes through the objective 10 and mirror 9 onto the photo-conducting layer 14a, the field strength components shown in broken lines in the plan view according to FIG. 6, run exclusively at right angles to the strips of the electrode raster 23. The crests of the waves and the valleys of the waves of the mirrored surface 17 extend consequently parallel to the strips of the electrode raster 23 and at right angles to the bars 4. The thus distorted mirrored layer 17 acts indeed as diffraction grating, but does not allow light of the source 1 being passed through the gaps between the bars 4 towards the screen, because due to the relative orientation of electrode raster 23 and bars 4, diffraction takes place exclusively in the longitudinal direction of the bars 4 and thus the images of the illuminated bars still fall on the bars.

The situation changes when, according to the arrow 0, FIG. 1, light falls through the raster 12a and electrode raster 23 on the photo-conducting layer 14a. Then the obliquely running strips, shown grey in FIG. 6a, are unilluminated because of the shadow effect of raster 12a, the intermediate bright strips however being illuminated. At those places, to which the light comes, the electric resistance of the photo-conducting layer 14a changes, thus causing a different distribution of the electric field, as indicated by the dotted streamlines in FIG. 6a. The cambered run of the streamlines permits of recognizing the presence of a locally variable field component parallel to the strips of the electrode raster 23. This, however, as apparent from the electrostatic theory of potential, entails a variability of the electric field strength at the surface of the mirrored layer 17 in the direction parallel to the strips of the electrode raster 23, and therefore at right angles to the longitudinal edges of the bars 4, and leads to corresponding deformations of the layers 17 and 18 which diffract the light of source 1 also in such a way that it penetrates now through the gaps between the bars 4 in the direction of the arrow P to the projection screen. Hence on the screen those places are illuminated which correspond to the illuminated places of the photo-conducting layer 14a. In this way, an image projected onto the conducting layer 14a can be transmitted onto the screen with an intensity of light which is independent of the image projected on the conducting layer and is only limited by the output of the light source 1.

In order to obtain the described effect, the source of potential $U_1$ is not absolutely necessary; in a given case it may even be left out. At any rate, the use of said source amplifies the effect of the distribution of potential in the photo-conducting layer 14a onto the deformable layers 17, 18.

It is only the distribution of potential in the layer 14a that determines the forces acting upon the surface of the mirrored layer 17, in contradistinction to the known embodiment according to FIGS. 2 and 3, where only the distribution of the whole potential on the photo-conducting layer 14 and space 16 defines the conditions of potential determining the deformation of the mirrored layer 17. For this reason, the described arrangement according to the invention allows all the initially mentioned disadvantages to be eliminated. The photo-conducting layer 14a may be kept as thin as desired, so long as only its electric resistance is not affected by shunt of its underlay, i.e. the plate 22. The difficulties of thick conducting layers with high absorption coefficient are thus overcome. Now, instead of granular agglomerates, layers deposited by evaporation in vacuo with their merits concerning electrical and optical homogeneity are usable to their full extent. Moreover, the difficulty of a high specific electric resistance of the layer 14a is removed, inasmuch as a suitable selection of the potential $U_2$ and thickness of the layer 14a allows any value practically available.

The line raster 12a may be replaced by other forms of rasters, say by a point raster 12*b* as illustrated in FIGS. 7 and 7*a*. The point raster consists of a plurality of spaced opaque surface portions of, say circular form. These surface portions lie at least partially before the spaces between the strips of the electrode raster 23. If no light passes through the rasters 12*b* and 23 onto the photo-conducting layer 14*a*, within the latter there is the course of current as shown in FIG. 7, which corresponds to that according to FIG. 7 of the previous example. Hence no illumination of the projection screen takes place. If the photo-conducting layer 14*a* is illuminated through the two rasters 12*b* and 23, the streamlines in layer 14*a* run as shown in FIG. 7*a*, because, on the illuminated surfaces shown white, the conducting layer assumes a different electric resistance at the places shown grey and lying in the shadow of raster 12*b*. The field strength components, running parallel to the strips of the electrode raster 23 and at right angles to the bars 4, effect a corresponding deformation of the mirrored surface 17, so that light falls on the screen at those places that correspond to the illuminated portions of the photo-conducting layer 14*a*.

The same action also results if, according to a form of embodiment (not shown), instead of the point raster 12*b* there is an apertured raster which is complementary thereto and has portions of its surface spaced apart from each other and permeable to light, and lying at least partly before the spaces between the strips of the electrode raster 23.

As a matter of fact, with weak illumination, many photoelectric conducting substances show a big onset and decay time of the photo effect. This onset and decay time may be reduced by an additional illumination, say with infrared light. In order to achieve this aim, in all aforedescribed forms of embodiment, the raster 12*a* or 12*b* may be made of a material permeable to the additional light, such as bismuth sulfide, which however does not allow visible light, for instance white light, to pass through. Thus it is possible to have the photo-conducting layer illuminated uniformly through the raster 12*a* or 12*b* by infrared light, without any following lighting up of the screen, even though the infrared additional light causes an appreciable photo-effect in the conducting layer 14*a*. It is also possible to attain acceleration of the onset and decay phenomena, without disturbing the functioning of the arrangement. On the other hand, the visible light, with the help of which the image to be amplified is thrown onto the conducting layer 14*a*, produces on same a shadow corresponding to the raster 12*a* or 12*b*, and this leads to the lighting up of the screen in the above-described way.

The example of embodiment shown in FIGS. 8–11 differs from the ones hitherto described in that instead of the raster 12*a* or 12*b* there is a raster 12*c* of different design, which comprises two groups of spaced juxtaposed strips I and II. The longitudinal edges of the strips I of one group run parallel to the longitudinal edges of the strips of the electrode raster 23, whereas the longitudinal edges of the strips II of the other group intersect at right angles the longitudinal edges of the strips of the electrode raster 23. Furthermore, the strips I and strips II are permeable to and suppressing respectively different light frequencies. Let it be assumed in the present case, that the strips I only permit red light to pass through and are impermeable for light of any other color, and that the strips II only permit blue light to pass through and are impermeable to light of any other color. Also in this case the strips of the electrode raster 23 run orthoganally to the bars 4.

If the photo-conducting layer 14*a* is only illuminated with red light through the rasters 12*c* and 23, the conducting layer 14*a* will be in the condition shown in FIG. 9. The portions shown bright are illuminated as if the strips I were not present. On the other hand, the strips II, only permeable to blue light, throw shadow portions shown grey. In the direction parallel to the strips of the electrode raster 23 no component of the electric field arises; the streamlines indicated by broken lines remain rectilinear and at right angles to the longitudinal edges of the strips of the electrode raster 23. Therefore no diffraction of the light of source 1 takes place in the direction transverse of the optical grid 4, so that no light of the source 1 falls through the gaps between the bars 4 onto the projection screen in the direction of the arrow P.

If the conducting layer 14*a* is only illuminated with blue light, it will be in the condition shown in FIG. 10. The blue light is allowed to pass through unobstructed by the strips II so that merely the strips I cause a shadow-effect on the conducting layer 14*a*, corresponding to the portions shown grey. Also in this case, the electric streamlines remain rectilinear and at right angles to the strips of the electric raster 23, so that no diffraction of the light of source 1 takes place transverse of the gaps between the bars 4 and hence no lighting up of the screen.

However, on illuminating the conducting layer 14*a* through the rasters 12*c* and 23 simultaneously with red and with blue light, both the strips I and strips II of raster 12*c* produce a shadow effect on layer 14*a*, as shown in FIG. 11. At the crossing places of the strips I and II shown in dark-grey, no light at all falls on layer 14*a* which consequently undergoes no change in resistance. The portions shown bright-grey are illuminated either only by red or only by blue light; hence there occurs a certain change in resistance of the layer 14*a*. Still a stronger change in resistance of layer 14*a* results at the places shown white in FIG. 11, which are illuminated both by red light and by blue light. Since the last-named places lie between the strips of the electrode raster 23, a cambered run of the electric streamlines then occurs, and on the photo-conducting layer a variable distribution of potential takes place in the direction of the strips of electrode raster 23, which induces forces on the deformable layers 17, 18 so that the mirrored layer 17 is deformed transversely of the bars 4. Hence the light of source 1 will be diffracted in such a way that it passes partly through the gaps between the bars 4 towards the screen in the direction of the arrow P.

With the last-described arrangement, light signals coincident in time can be noted, since only on illuminating the conductor layer 14*a* by red light and by blue light simultaneously, there ensues a lighting up of the corresponding portion of the screen.

In all described examples of embodiment, the screen, on which the light of source 1 falls in the direction of the arrow P (FIG. 1), may be replaced by a piece of ground-glass or even by an ordinary ocular, for direct observation. The strip-shaped diaphragms 4 and the strips of the electrode raster 23, as well as those of rasters 12*a* and 12*c*, need not have in each case rectilinear longitudinal edges running parallel to each other. The only condition for the functioning of the arrangement in the aforedescribed way is that the strips of the electrode raster 23 are disposed orthogonally to the longitudinal edges of the diaphragms 4. If the diaphragms consist, for instance, of concentric annuli, the strips of the electrode raster should be sector-shaped and possess edges running radially to said annuli. In applying this case to the mode of functioning of the last-described example according to FIGS. 8–11, also the strips of raster 12*c* permeable to different light frequencies should be annular or sector-shaped, respectively.

As can be seen from the example according to FIGS. 8 to 11, the frequency of the light used for illumination of the conducting layer 14*a* need not be the same as the frequency of the light of source 1. Therefore the arrangement may also serve as a frequency transformer. Thus it is for instance possible to throw an image produced by infrared light and invisible for the human eye, onto the photo-conducting layer 14*a*—in that case sensitive to infrared light—and to cause on the screen a corresponding visible image by the light of source 1. The applications of the arrangement according to the invention are numerous and practically unlimited, inasmuch as the light-sensitive conducting layer may now be made of any suitable material and practically as thin as desired, without thereby impairing the action of the arrangement.

What we claim is:

1. Apparatus for amplifying the brightness of an optically formed image comprising a strong light source, means illuminated by said light source for establishing a plurality of spaced strip-shaped zones having a high degree of brightness as compared with that of said image to be amplified, a mirrored surface reflecting light coming from said illuminated strip-shaped zones, an optical system for imaging said mirrored surface to a viewing position, said optical system comprising a diaphragm constituted by a plurality of parallel spaced opaque strip-shaped bars, said mirrored surface being a part of a multiple layer light modulating control member including a layer deformable by electrostatic field forces at one side of which said mirrored surface is applied, and a photoelectric conducting layer on which the image to be amplified is formed from the side opposite to said mirrored surface, said photoelectric layer serving to modulate a normally uniform electrostatic field acting upon said deformable layer in accordance with the variation in light intensity in said image to thereby effect a corresponding modulated deformation of said deformable layer and hence also of said mirrored surface, said mirrored surface and a part of said optical system imaging said illuminated strip-shaped zones on the bars of said diaphragm when said deformable layer and mirrored surface remain non-deformed corresponding to an image light intensity of zero value so that all of the light from said light source is stopped by said bars whereas deformations in said deformable layer and mirrored surface in response to corresponding modulations in light intensity in said image are effective to permit a corresponding modulated passage of light from said light source through the spaces between said bars to said viewing position, and said multiple layer light modulating control member further including an electrode raster layer disposed adjacent that side of said photo-electric conducting layer which is nearest to the incoming light from said image, said electrode raster layer being comprised of two groups of interdigitated electrically conductive strips arranged in juxtaposed spaced relation, the longitudinal edges of said strips being oriented orthogonally to the longitudinal edges of said bars, and an additional raster layer disposed adjacent that side of said electrode raster layer which is nearest to the incoming light from said image, said additional raster layer being comprised of portions impermeable to light of at least certain frequencies and said light impermeable portions having a geometrical configuration differing from that of the strips of said electrode raster layer, a source of voltage, and means applying said voltage between said groups of interdigitated strips of said electrode raster layer.

2. Apparatus for amplifying the brightness of an optically formed image as defined in claim 1 wherein said multiple layer light modulating member includes a first carrier plate permeable to light and made from electrically insulating material and upon one face of which said electrode raster layer is applied, said electrode raster layer being covered directly by said photo-electric conducting layer.

3. Apparatus for amplifying the brightness of an optically formed image as defined in claim 1 wherein said multiple layer light modulating member includes a first carrier plate permeable to light and made from electrically insulating material and upon one face of which said electrode raster layer is applied, said electrode raster layer being covered directly by said photo-electric conducting layer, and a second carrier plate permeable to light and upon one face of which said additional raster layer is applied, said additional raster layer being in contact with the opposite face of said first carrier plate.

4. Apparatus for amplifying the brightness of an optically formed image as defined in claim 1 wherein said photo-electric conducting layer is located at one side of said deformable layer and wherein said multiple layer light modulating member further includes an additional electrode layer permeable to light located at the other side of said deformable layer, a second voltage source and means applying said second voltage between said additional electrode layer and the electrically conductive strips of said electrode raster layer.

5. Apparatus for amplifying the brightness of an optically formed image as defined in claim 1 wherein the light impermeable portions of said additional raster layer are comprised of juxtaposed spaced strips the longitudinal edges of which form an angle of less than 90° with the longitudinal edges of the strips of said electrode raster layer.

6. Apparatus for amplifying the brightness of an optically formed image as defined in claim 1 wherein the light impermeable portions of said additional raster layer are comprised of spaced surface portions located at least partly before the spaces between the strips of said electrode raster layer.

7. Apparatus for amplifying the brightness of an optically formed image as defined in claim 1 wherein the light impermeable portions of said additional raster layer are comprised of strips of light impermeable material and which include spaced light permeable portions located at least partly before the spaces between the strips of said electrode raster layer.

8. Apparatus for amplifying the brightness of an optically formed image as defined in claim 1 wherein the light impermeable portions of said additional raster layer are comprised of two groups of juxtaposed spaced strips, the strips of one group intersecting the strips of the other group.

9. Apparatus for amplifying the brightness of an optically formed image as defined in claim 8 wherein the strips of one group of said additional raster layer are permeable to light of one frequency and the strips of the other group are permeable to light of a different frequency and wherein the longitudinal edges of the strips of said electrode raster layer extend parallel to the longitudinal edges of the strips of one group of said additional raster and orthogonally to the longitudinal edges of the strips of the other group.

References Cited in the file of this patent

UNITED STATES PATENTS

| | | |
|---|---|---|
| 2,896,507 | Mast et al. | July 28, 1959 |
| 2,910,532 | Auphan | Oct. 27, 1959 |